Figure 1:
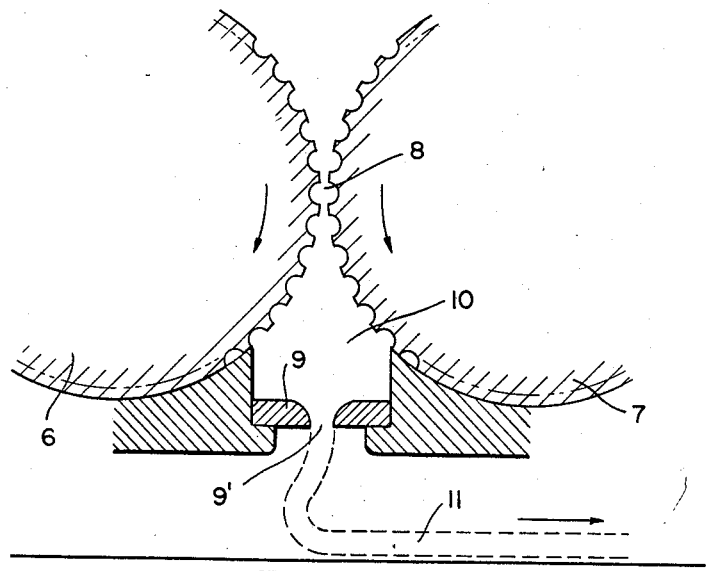

Oct. 20, 1959     P. BAUR     2,909,131

DEVICE FOR FORMING BANDS OF DOUGH IN CONTINUOUS OPERATION

Filed Sept. 18, 1956

*INVENTOR.*
PAUL BAUR
BY
*Hane and Nydick*
ATTORNEYS

United States Patent Office 2,909,131
Patented Oct. 20, 1959

2,909,131

DEVICE FOR FORMING BANDS OF DOUGH IN CONTINUOUS OPERATION

Paul Baur, Stuttgart-Feuerbach, Germany, assignor to Werner & Pfleiderer, Stuttgart-Feuerbach, Germany, a company of Germany Application September 18, 1956, Serial No. 610,687

5 Claims. (Cl. 107—12)

The present invention relates to a device for forming bands of dough in continuous operation, especially of dough as used for hard cookies and similar bakery products, and more particularly to a device of the kind employing two rotary rollers spaced apart to form a feed gap therebetween and a gauge including a pass slot or opening disposed posterior of the feed gap as seen in the direction of the movement of the dough.

Band forming devices of the general kind above referred to, comprise as gauge a slotted plate which forms in conjunction with the two rollers a chamber situated posterior of the feed gap. The dough is forced by the rollers out of the chamber through the slot in the plate.

It has been found impossible in practice to give the dough in the band a consistency such as is necessary to form or cut pieces of dough from which a fully satisfactory bakery product can be baked. The production of fully acceptable bakery products requires that the band of dough has a smooth surface and is practically free of internal tensions and that the dough itself is of uniform consistency and density. The band forming devices as heretofore known and above referred to, necessitate the use of additional means and operations. It has been found that the band must be pressed out comparatively thick and subsequently passed through one or several roller devices. Such additional roller devices, especially several in series arrangement, are not desirable as they increase the space occupied by an installation for forming bands of dough. They also increase the costs of the installation and it is practically impossible to prevent folds and pleats from being squeezed into the band. The removal of such folds and pleats is always difficult and sometimes impossible.

Attempts have been made to dimension the slot in the gauge plate through which the dough is pressed out in accordance with the desired thickness and width of the final band to obtain a band ready for use in one operation. However, such attempts were unsuccessful. A band pressed out through the slot of a device as previously described is never sufficiently uniform in its consistency, its surface is not sufficiently smooth but generally shows crevices and the dough is also not of uniform density. Furthermore, part of the dough tends to remain in the comparatively large chamber of the device, especially in the dead corners thereof. As a result, part of the dough becomes overaged and such overaged dough mixes itself with the fresh dough travelling directly through the gap to the slot of the pressure plate thereby causing a deterioration of the quality of the dough forming the band.

There are further known devices of an entirely different type for forming a dough band in continuous operation. Such devices employ triple roller systems, longitudinal and cross rollers and roller systems with means for forcing dough into the gap between the rollers. It may be left open whether devices of this kind produce a fully satisfactory band of dough since the present invention is concerned with an improvement on devices of the kind initially referred to.

One object of the present invention is to provide a novel and improved band forming device of the kind employing two rollers defining a gap therebetween followed by a dough forming gauge which device produces a band of dough in which the consistency of the dough and the surface smoothness of the band are such that the band can be fed directly to cutting and other stations for forming the desired bakery product.

Another object of the invention is to provide a novel and improved dough forming device of the kind above referred to, which produces a band of dough in which the dough has a high and uniform density, is practically free of internal tensions and has a smooth surface.

Still another object of the present invention is to provide a novel and improved dough forming device which allows a convenient adjustment of the thickness of the band of dough delivered by the device.

A further object of the invention is to provide a novel and improved dough forming device which can be conveniently set for different rates of delivery of the dough band.

Other and further objects, features and advantages of the invention will be pointed out hereinafter and set forth in the appended claims forming part of the application.

In the accompanying drawing a preferred embodiment of the invention is shown by way of illustration and not by way of limitation.

Figure 2:
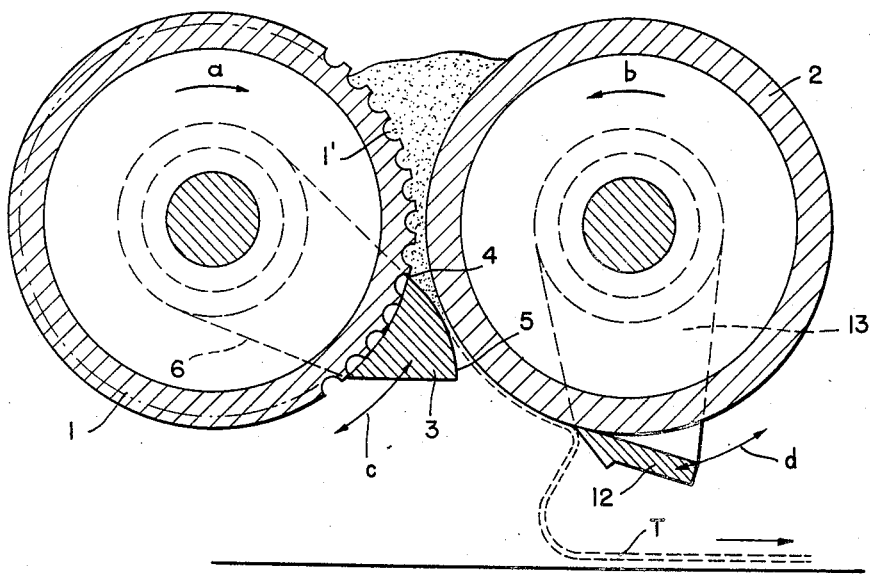

In the drawing:

Fig. 1 is a fragmentary sectional view of a dough forming device of conventional design, and Fig. 2 is a sectional view of a dough forming device according to the invention.

The two figures of the drawing show only those components of the devices which are essential for the understanding of the function thereof. The drive means for the rollers, the speed regulating means and part of the adjustment means of the device according to the invention are omitted as all such means are obvious to the person skilled in the art and suitable conventional means may be employed.

Fig. 1 which shows the conventional device, comprises two rotary rollers 6 and 7 driven by any suitable drive means in the direction indicated by the respective arrows. The two rollers are mounted spaced apart to define a feed gap 8 therebetween. The pressure plate 9 defines together with the two rollers a chamber 10 into which the dough is fed through gap 8 and from which it is pressed out through a slot 9' in plate 9 to form the dough band 11.

The shortcomings of the device according to Fig. 1 have been previously fully explained.

Referring now to the device according to the invention, this device also comprises two rollers 1 and 2 which rotate in the direction indicated by arrows $a$ and $b$. The two arrows are of unequal length to indicate that roller 1 is preferably rotated with a higher rate of speed than roller 2. The periphery of roller 1 is advantageously provided with axial grooves or riflings 1'. As mentioned before, suitable speed regulating means of conventional design may be provided to regulate the rotational speed of both rollers either separately or jointly so that the ratio of rotation is maintained. By changing the rotational speed of the rollers, the rate of delivery of the band may be varied.

A generally wedge shaped body 3 is disposed at the outlet end of the gap between the two rollers—it being assumed that the dough is fed to the rollers from the top side thereof as shown in the figure—as closely as possible to roller 1 at least at the sharp edge 4 of the body which faces the gap between the rollers. The side 5 of body 3 facing roller 2 is preferably slightly convex and defines in conjunction with roller 2 a discharge or pass slot the width of which determines the thickness of dough band T. To permit adjustment of the thickness of the dough, member 3 is mounted on an arm or bracket 6 which is pivotal about the rotational axis of roller 1. As is indicated by arrow c, pivoting of arm 6 in either direction permits increase or decrease of the thickness of the dough of the band as desired. Suitable setting means for adjusting arm 6 may be provided.

A knife 12 associated with roller 2 serves to vary the point at which band T is stripped off the circumference of roller 2. This knife may be pivoted in either circumferential direction as is indicated by arrow d by means of an arm or bracket 13 pivotal about the rotational axis of roller 2.

As extensive tests with the device according to Fig. 2 have shown, the same delivers a band of dough which can be directly fed to the next station such as a dough cutting machine. The material and truly surprising difference between the characteristics of a dough band as delivered by the device of Fig. 1 and a dough band as delivered by the device of Fig. 2 is apparently due to the fact that in the device of Fig. 1 the dough in effect merely flows out of the comparatively large quantity of dough contained in chamber 10 whereas in the device of the invention the dough is forced between the gap and the most narrow part of the discharge slot through a space in which it experiences a very vigorous kneading, grinding and stirring action. Furthermore, roller 1 rotating with a higher circumferential speed than roller 2 feeds a larger quantity of dough toward the edge 4 of body 3 than roller 2. The latter roller controls the discharge of dough through the pass which it forms with the side 5 of member 3. As a result, there is always an excess of dough in the space which is partly bounded by body 3 and which does not contain any dead corners. This excess compels the dough to yield to the resistance offered by body 3 and it can yield only in the direction back into the gap between the rollers and only along the circumference of the comparatively slowly rotating roller 2. This dough movement results in the aforementioned intensive stirring, kneading and grinding action which in effect tears apart the dough in a multitude of small kernels or globules. These kernels or globules are strongly compacted when and while the dough passes through the narrow passage slot producing a band which is free of tension, has a smooth surface without crevices or rough spots and in which the dough is of homogeneous density and consistency.

In other words, the device according to the invention produces a high quality dough band by using extremely simple and inexpensive means the action of which is far superior to that of any means that were heretofore known for the purpose.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for forming a band of dough in continuous operation, said device comprising two rollers rotary in opposite directions and at different rotational speeds, said rollers being mounted parallel in peripherally spaced relationship to define a dough passage gap between the rollers, said rollers moving dough fed between the same on one side of the gap through the gap, and a gauge for forming a dough band extending between the rollers on the other side of the gap, said gauge having a wall portion facing the periphery of the faster roller closely hugging the same to prevent the passage of dough between said wall portion and said faster roller and another wall portion facing the periphery of the slower roller but spaced therefrom to define a dough discharge gap, the free area of said discharge gap being less than the free area of the gap defined between the rollers, the space between the rollers defined by said gauge and communicating with said passage gap constituting a kneading chamber.

2. A device for forming a band of dough in continuous operation, said device comprising two rollers rotary in opposite directions and at different rotational speeds, said rollers being mounted parallel in peripherally spaced relationship to define a dough passage gap between the rollers, said rollers moving dough fed between the same on one side of the gap through the gap, and a gauge for forming a dough band extending between the rollers on the other side of the gap, said gauge having a wall portion curved concavely in reference to the periphery of the faster roller to match the curvature of said roller and disposed closely adjacent to the periphery thereof to prevent the passage of dough between said wall portion and said faster roller and another wall portion curved convexly in reference to the periphery of the slower roller and spaced from the periphery thereof to define a dough discharge gap between the periphery of the slower roller and the convex wall portion, the space between the free area defined between the rollers being larger than the free area defined between the gauge and the slower roller, the rollers defined by said gauge and communicating with said passage gap constituting a kneading chamber.

3. A device according to claim 2, wherein the periphery of the faster roller is axially rifled.

4. A device according to claim 1, wherein said gauge is mounted adjustable relative to the periphery of said slower roller to vary the width of said discharge gap.

5. A device according to claim 2, wherein said gauge is supported on a bracket mounted pivotal about the rotational axis of said faster roller to vary the spacing between said convex wall portion and the periphery of the slower roller by pivoting said bracket.

References Cited in the file of this patent
UNITED STATES PATENTS

| | | |
|---|---|---|
| 738,243 | Romers et al. | Sept. 8, 1903 |
| 1,249,294 | Sonsthagen | Dec. 4, 1917 |
| 1,975,326 | Loose et al. | Oct. 2, 1934 |
| 2,596,215 | Crosland | May 13, 1952 |
| 2,596,277 | Naylor | May 13, 1952 |
| 2,608,939 | Naylor | Sept. 2, 1952 |
| 2,625,893 | Semple | Jan. 20, 1953 |
| 2,724,348 | Neutelings et al. | Nov. 22, 1955 |
| 2,740,362 | Elliott | Apr. 3, 1956 |

FOREIGN PATENTS

| | | |
|---|---|---|
| 321,403 | Great Britain | Nov. 4, 1929 |